United States Patent [19]

Sieke

[11] Patent Number: 4,556,174

[45] Date of Patent: Dec. 3, 1985

[54] APPARATUS FOR TREATING DISPERSIONS AND THE LIKE WITH NON-SINUSOIDAL VIBRATION

[76] Inventor: Helmut Sieke, Bingertstr. 10, D-6200 Wiesbaden, Fed. Rep. of Germany

[21] Appl. No.: 583,491

[22] Filed: Feb. 29, 1984

Related U.S. Application Data

[63] Continuation of Ser. No. 273,770, Jun. 15, 1981, abandoned.

[30] Foreign Application Priority Data

Jun. 26, 1980 [DE] Fed. Rep. of Germany ....... 3023886

[51] Int. Cl.⁴ ........................ B02C 1/00; B02C 19/16
[52] U.S. Cl. ........................................ 241/1; 241/30; 241/283; 241/301
[58] Field of Search ................. 241/1, 301, 283, 170, 241/37, 57, 30, 175, 176, 177; 91/39; 366/118

[56] References Cited

U.S. PATENT DOCUMENTS

| 195,120 | 9/1877 | Golding | 241/175 |
|---|---|---|---|
| 2,613,036 | 10/1952 | Robinson | 241/175 |
| 3,399,869 | 9/1968 | Loria et al. | 366/118 X |
| 3,467,546 | 5/1970 | Barnett | 427/757 |
| 3,556,414 | 1/1971 | Eberly, Jr. | 241/1 |
| 3,677,805 | 7/1972 | Page et al. | 427/345 |
| 3,680,841 | 8/1972 | Yagi et al. | 366/118 |
| 3,810,417 | 5/1974 | Sieke | 91/39 |
| 3,913,847 | 10/1975 | Glatt et al. | 241/57 X |
| 4,107,790 | 8/1978 | McCord | 366/118 X |
| 4,131,238 | 12/1978 | Tarpley, Jr. | 241/283 X |
| 4,232,972 | 11/1980 | Levin | 366/118 X |
| 4,295,614 | 10/1981 | Bond, III | 241/37 X |

FOREIGN PATENT DOCUMENTS

| 303386 | 8/1930 | Canada . | |
|---|---|---|---|
| 498632 | 12/1933 | Canada . | |
| 500293 | 3/1934 | Canada . | |
| 580983 | 8/1959 | Canada . | |
| 606698 | 10/1960 | Canada . | |
| 644728 | 7/1962 | Canada . | |
| 747886 | 12/1966 | Canada . | |
| 766925 | 9/1967 | Canada . | |
| 812535 | 5/1969 | Canada . | |
| 885409 | 11/1971 | Canada . | |
| 957589 | 11/1974 | Canada . | |
| 994640 | 8/1976 | Canada . | |
| 1050393 | 8/1979 | Canada . | |
| 2152497 | 4/1972 | Fed. Rep. of Germany | 336/118 |
| 563186 | 6/1977 | U.S.S.R. | 241/301 |
| 808145 | 3/1981 | U.S.S.R. | 241/301 |

Primary Examiner—Howard N. Goldberg
Assistant Examiner—Timothy V. Eley

[57] ABSTRACT

Process and apparatus for treating material by applying non-sinusoidal vibrations. In apparatus for separating solids from the liquid phase of a dispersion, non-sinusoidal vibration is applied by vibrating at least a portion of a wall of a receptacle for the dispersion or by a vibrating plate, a pair of vibrating plates or a hollow body in the receptacle. In a roller mill for crushing material one of the rollers is vibrated axially relative to the other. In a juice press a vibrating plate is provided at the bottom of the press cylinder. In a jaw crusher, one of the jaws is vibrated in a direction parallel to the face of the jaw. In a ball mill comprising a cylinder rotating on a horizontal axis, the cylinder is vibrated in an axial direction. Non-sinusoidal vibration is produced by a hydraulic servomotor fed with pulses of hydraulic pressure fluid by a rotary control valve.

19 Claims, 15 Drawing Figures

APPARATUS FOR TREATING DISPERSIONS AND THE LIKE WITH NON-SINUSOIDAL VIBRATION

This is a continuation of application Ser. No. 273,770, filed June 15, 1981, now abandoned.

FIELD OF INVENTION

The invention relates to a process and apparatus for treating solid and flowable material, in particular, flowable solid material mixtures and dispersions through vibrating implements.

BACKGROUND OF INVENTION

For years, vibrating implements have been employed to compact flowable solid material in the form of gravel, crushed rock, fresh concrete, and other building materials. The implements used produced a sinusoidal vibration capable of dispelling upwardly any air bubbles occurring in the material. However, any effect on the material itself was very limited. First, the use of the vibration as it can be produced, for example, through German patent specification No. 1957469, as well as through German patent No. 2213577, created the possibility of thoroughly working and thickening materials. The apparatus here disclosed was able to produce vibration which could then be applied to the material. A further possibility of treatment is disclosed in No. DE-OS2418858-7. In all cases, vibration could be produced through impulse-hydraulic-control-apparatus by means of hydraulic oil impulses and converted into mechanical impulses by means of a servo-motor in the form of a rotary motor and/or hydraulic cylinder piston unit.

SUMMARY OF INVENTION

The present invention is of particular significance for the treatment of flowable solid material mixtures, dispersions, and emulsions through vibrating implements. It has been determined through tests that the use of hydraulic impulses on flowable mixtures can lead to the separation and also to an intense homogenous mixing. Separation can be effected through the use of specific non-sinusoidal impulse forms of high frequency while a homogenous mixing can be obtained through the use of like implements with half or lower frequency.

Various possibilities are known for separating specific heavy particles from lighter particles. The simplest, but also the oldest process, is separation by means of gravity in which a dispersion is allowed to stand in a basin or vessel whereby, through the lapse of time, more and more of the specific heavy parts collect on the bottom. In many branches of the technique, centrifuges are also used for this purpose. Instead of gravity, the centrifuge uses centrifugal force whereby the separation is achieved much more rapidly at the expense of using considerable energy.

The separation of solid material from the liquid phase of a dispersion carried out on a very large scale, for example in filtration plants, paper factories, chemical processes, etc., is accompanied by considerable difficulty in that here the solid material must be separated from very large quantities of dispersion as quickly as possible, but with only a little energy, so that the installation is not too large.

The separation of solids with different specific gravity gives rise in the technique to considerable difficulty which is greater when the specific gravities of the materials to be separated are near one another. In the dressing of ore-bearing stone from barren stone and after pulverizing the ore-bearing stone, it is difficult to separate the ore from the stone. It is likewise difficult to separate diamonds from fine-grain stone. Here the technique has contrived various processes of ore enrichment through flotation and other means which are expensive by reason of the machinery, energy, and labor required.

The use of vibrating implements and machines is particularly popular where the tool works on the material without any counter tool. Stone drilling equipment is in most cases provided with an impact device which imparts a vibrating movement to the drill in the working direction. Compacting equipment is provided with vibrators vibrating in a sinusoidal mode in order to achieve a more efficient compacting with rollers and levelling plates, for example. In other fields of the technique, in particular where the tool is power driven relative to a counter tool, the technique does not use vibration but seeks to avoid vibration insofar as possible. Such vibration is to be prevented because self-excited vibration in such tools normally leads to rapid tool wear, and also to damage of the factory building, as well as to unpleasant working conditions.

The applicant has found that in many work processes carried out by machines in which a tool is moved by power relative to a counter tool, improvement of the work process in the sense of a faster and more intensive working can be attained by imparting to the tool vibration which is not self-induced.

The applicant has further recognized that in many work processes—the separation of a mixture of solids or of a dispersion of solids in liquid, for example—the separation can be considerably facilitated through the use of controlled pulse sequences of a particular kind.

It is an object of the invention to provide a process and apparatus with which the processing intensity of material can be considerably increased and—in application to flowable mixtures—the parts of higher specific gravity can be separated relatively rapidly and with low energy consumption.

The invention resides in that a series of non-sinusoidal impulses are applied to the work tool and/or counter tool, and that preferably during the process, the acceleration and/or the vibration frequency and/or the vibration amplitude is varied especially continually.

In a series of applications, it is expedient if the work tool moves in one direction with a different acceleration than in the opposite direction.

In this manner it is possible to attain astonishing results which otherwise can be attained only with a great expenditure of energy and through long treatment. If, for example, in machine tools, material is worked with a vibrating tool, the work is carried out more rapidly and with greater intensity through different acceleration peaks in the forward and back movement of the tool. If a solid body is worked by grinding and polishing tools which move back and forth, the working of the tool is intensified when it is moved forwardly with different acceleration peaks than in its backward movement.

In particular, in the treatment and processing of flowable mixtures, whether of solids, liquids, or a solid-liquid mixture, astonishing results can be attained in this manner. Through vibration, especially in the range of 50 Hertz to 10,000 Hertz, an astonishingly fast agglomeration of the particles in suspension is obtained, which, when they are agglomerated to larger particles, sink rapidly to the bottom and remain there. For such vibration, relatively little energy is required—considerably less energy than, for example, in centrifuging which, with dispersions, often attains only moderate results.

It is advantageous when, during the course of treatment, the acceleration, and/or the vibration frequency, and/or the vibration amplitude is varied. Through such variation, there is attained a particularly intense processing and treatment in that different size particles respond differently to variable frequencies and variable amplitudes. Through variation of the acceleration, vibration frequency and vibration amplitude ranges can be established in which the different material parts react with particular intensity. In particular, it is advantageous when the vibration frequency is repeatedly varied between two limits. It is particularly advantageous when the material is treated with a frequency spectrum, for example 50 to 160 Hertz, 150 to 450 Hertz, or the like.

This process can be used in a wide variety of technical processes, for example, in filtration plants, settling tanks, sludge draining, paper manufacture, ore recovery, and similar areas where solids must be separated from liquids or from one another. It is also applicable, mostly with lower frequencies where materials are to be mixed, for example in the building material industry, abrasive wheel manufacture, and other branches of industry.

An essential characteristic of the invention is that a controlled vibration movement is applied to the implement and/or the counter implement. In this manner, many operations can be carried out more intensively and faster. For example, in the pressing of plant or animal material, the vibratory movement can lead to a bettter disintregation and also to a thicker layer of the solid material.

In particular, this is the case when the vibratory movement is transverse to the movement of the implement. For example, if a roller of a pair of rollers which crush the plant material is vibrated, there is produced during the pressing operation a pulverization of the plant parts that leads to a considerable improvement in the disintegration. If stone fruit such as plums, cherries, apricots and peaches, is pressed in a juice press, imparting a vibration movement leads to a considerable thicker layer of the solid material and thereby to a better pressing.

In order to prevent such vibration being transmitted to the factory floor on which the machine is installed, it is desirable to impart vibration movement in opposite phase to the implement and counter implement. In like manner, vibration resonance is eliminated.

It has been proved especially advantageous and efficacious when the vibratory movement is produced hydraulically by means of a servomotor acting on the tool or counter-tool and driven by hydraulic oil from a rotary valve which, in a constantly repeating sequence, rapidly connects the servomotor alternately with a source of hydraulic oil under pressure and with a return line. With this arrangement it is possible, through simply varying the speed of rotation of the rotary valve, to vary the frequency of the vibration to obtain an optimal value. At the same time, it facilitates in many cases finding the vibration best suited to the tool, the counter-tool, and the material being treated.

As vibration is transmitted, in particular on the machine support, in an undesired manner when there is not sufficient material to be treated between the tool and counter-tool, and thus also when the machine runs empty or nearly empty, it is desirable to interrupt the vibration movement when the tool and counter-tool have moved toward one another so that there is a definite predetermined distance between them.

The apparatus in accordance with the invention is characterized in that a hydraulic servomotor actuating the tool or counter-tool is driven by means of hydraulic oil from a rotary valve that connects the servomotor in a constantly repeating sequence alternately with a source of hydraulic oil under pressure and a return line, and that the rotary valve and/or its driving motor is provided with means whereby the frequency and/or amplitude may be varied by the moving part of the rotary valve and/or its driving motor.

With this apparatus there is produced a series of non-sinusoidal impulses which lead to astonishing results in carrying out the work process. Through the non-sinusoidal pulses which are varied in their frequency, acceleration, or amplitude, the speed of the treatment is considerably increased and solid materials in a dry state can be separated from one another which could otherwise be separated only through troublesome chemical and/or flotation processes and similar physical procedures. It is not only the specific gravity which leads to the floating out of particular parts in a solid material mix during vibration, but also certain characteristics, e.g., different grain size and/or surface characteristics which lead to a separation under the influence of vibration. For example, particles with a very smooth surface may be separated from particles with a rough surface.

An advantageous form of the apparatus is characterized by a hydraulic control valve of which a rotating axially moveable control cylinder is provided with annular grooves and branch channels having a component parallel to the axis. The branch channels communicate sequentially with conduits leading to the vibrating implement, while the annular grooves communicate respectively with ports in the housing connected with a hydraulic pressure line and a return line. Means are provided for driving the control cylinder in rotation at a variable speed, and for moving the control cylinder axially.

This apparatus is easy and economical to produce. Its energy requirements are relatively low.

In treating flowable materials, it is advantageous for the vibrating body to be a plate. However, it can be a pair of plates which are connected with one another through the vibrating means so that the two plates vibrate in opposite phase. The vibrating plate can also be a wall or part of a wall of the recepticle. Likewise, a vibrating rotary plate can be employed through which the space requirements are reduced.

Suitably, the vibration driving means comprises a hydraulic cylinder-piston unit. A hydraulic vibration drive of this kind is capable of transmitting suitably strong vibrations to the fluid. Moreover, hydraulic vibration means of this kind is capable of transmitting vibrations of different frequencies, including high frequencies in the range of several kilo-Hertz. Besides the high power intensity of the hydraulics, the linear acceleration process operates advantageously.

The vibrating member can also be a hollow body filled with hydraulic fluid which is set in vibration.

The vibratory drive can advantageously be realized by connecting the hydraulic cylinder-piston unit or hollow body with a hydraulic control device which has a rotating or ocillating control cylinder by means of which the hydraulic cylinder or hollow body can be alternately connected with a hydraulic pressure line and a return line. Through this alternate connection with the pressure line and the return line strong impulses can be produced which are efficiently transmitted in the fluid.

In the use of this apparatus in a settling tank, it is advantageous when at least one vertical plate is suspended in the fluid in the tank. In this manner, the solid material of a dispersion with a predominant liquid part can, with limited energy expenditure, be rapidly agglomerated so that it settles to the bottom of the receptacle. If two or more vibrating plates are employed in a settling tank, they are advantageously suspended in vertical alignment.

From a dispersion with very high solid content which can be called swampy, liquid can be brought to the upper surface by means of a horizontal vibrating body which is preferably arranged at the bottom of the receptacle. The liquid thus separated is advantageously led to an adjacent receptacle where the sludge obtained is further dewatered.

In this applicaation it is advantageous when nozzles are provided at the bottom of the receptacle for introducing air or oxygen whereby the vibrating plates can be apertured so that these nozzles can be arranged in or under the apertures. In this manner, the resulting sludge is already enriched with oxygen so that the decaying bacteria can already begin their activity.

In the application of moving tools, in particular for machining and grinding, it is advantageous when a tool and counter-tool are energized with vibration of opposite phase so as to avoid transmission of vibrations to the machine support and factory floor.

It has been found particularly advantageous when the vibrating movement is crosswise to the direction of movement of the tool.

For the production of the vibration, it is advantageous to actuate the tool and/or counter-tool by a hydraulic servomotor which is supplied with hyraulic oil from a rotary valve which connects the servomotor in continually repeated sequence very rapidly, alternately with a hydraulic pressure line and a return line.

In order to avoid premature tool wear or destruction and unnecessary transmission of vibration to the machine support and factory floor when the machine is running idle, it is advantageous to provide a control for the vibratory motor which switches off when the distance between the tool and counter-tool falls below a predetermined distance. Advantageously, the control device for this purpose can be provided with a pressure pick-up or with a motion pick-up.

BRIEF DESCRIPTION OF DRAWINGS

The nature and advantages of the invention will appear more fully from the accompanying drawings in which preferred embodiments of the invention are illustrated schematically. In the drawings.

DESCRIPTION OF PREFERRED EMBODIMENTS

Figure 1:
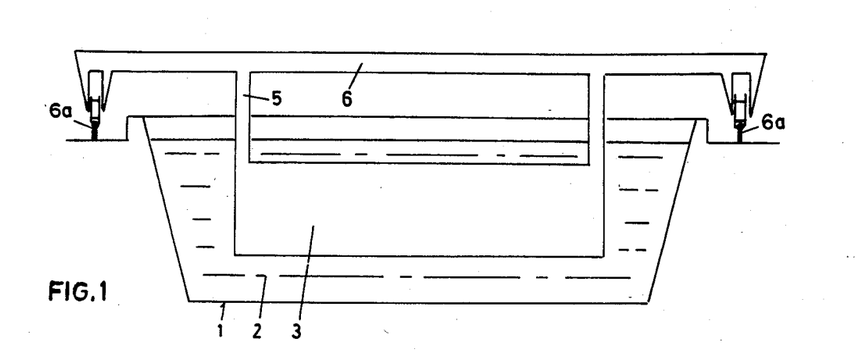
FIG. 1 is a schematic cross-section through a settling tank in which a pair of plates is suspended and in which solid matter is to be separated from a dispersion.
Figure 2:
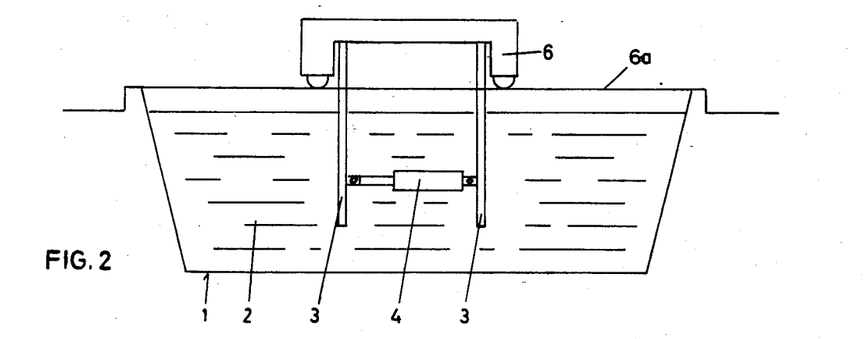
FIG. 2 is a schematic longitudinal section through the settling tank shown in FIG. 1.

With reference to FIGS. 1 and 2, a tank or receptacle 1 contains a dispersion 2 in which a pair of plates 3 are suspended. The plates 3 are connected with one another by means of a hydraulic cylinder-piston unit 4. The plates 3 are suspended by means of supports 5 from a carriage 6 which runs on rails 6a at the sides of the receptacle. The carriage 6 is provided with means for raising the plates 3 so that they can be positioned at different heights and can be lifted completely out of the dispersion in the receptacle.

Figure 5:
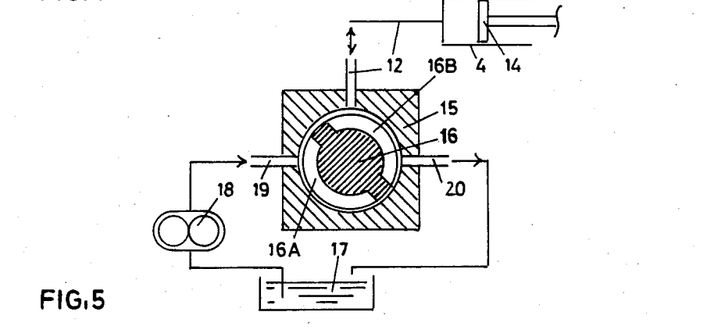
FIG. 5 is a cross-section through a control device.
Figure 6:
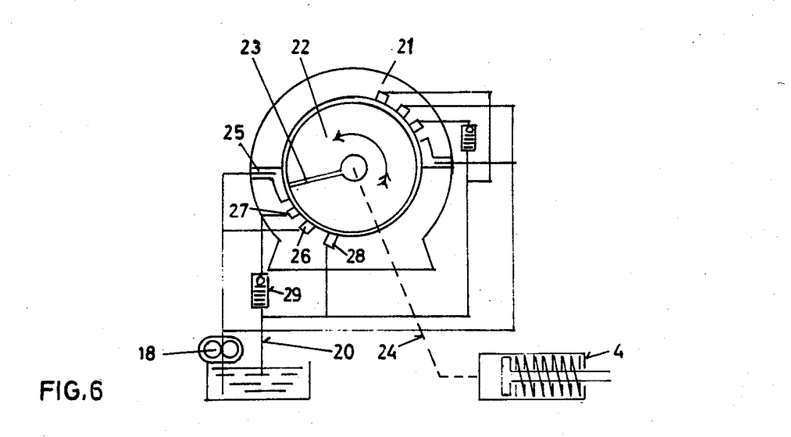
FIG. 6 is a cross-section through another control device.

A control device such as that shown in FIG. 5 or FIG. 6 is used to drive the hydraulic cylinder-piston unit 4 to vibrate the plates 3. This control device can advantageously be arranged on the carriage 6. If the plates 3 were to be vibrated with conventional sinusoidal pulses, nothing would be altered in the dispersion. Only by activating the plates with non-sinusoidal pulses and, indeed, pulses in which the acceleration in one direction is greater than in the other direction, a rapid precipitation of the solid material is obtained when the frequency is continually varied within a predetermined range.

In a filtration plant, the receptacles as illustrated in FIG. 1 are advantageously used for clarifying the dirty water from the sewer system.

Figure 3:
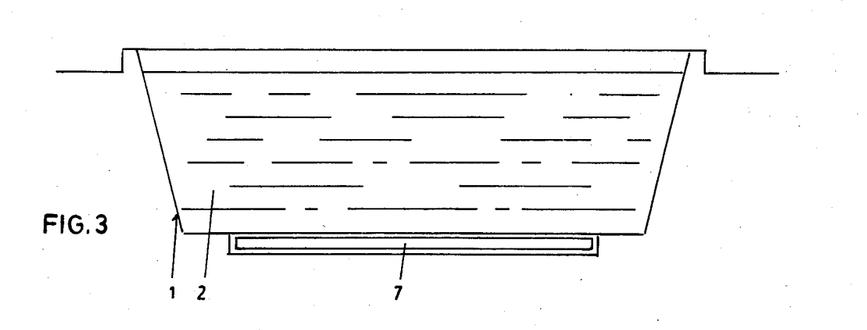
FIG. 3 is a cross-section through another receptacle having a vibrating bottom.

In FIG. 3 there is shown a receptacle in which a part of the bottom is formed as a vibrating body 7 which can also consist of plates but also can be a hollow body filled with hydraulic fluid. The receptacle of FIG. 3 is advantageously used in a sewage treatment plant to separate from the sludge, water which rises to the upper surface. A vibrating body such as the vibrating body 7 shown in FIG. 3 can additionally be used in the receptacle of FIG. 1 in order, alternately, first to clarify the dirty water, and then further to thicken the sludge whereby the sludge from one receptacle can advantageously be added to another receptacle.

Figure 4:
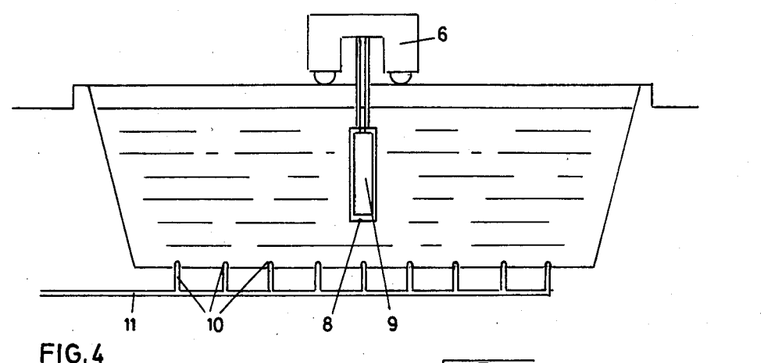
FIG. 4 is a cross-section through a further receptacle.

In the receptacle 1 of FIG. 4, a hollow body 8 is suspended from a carriage 6 running on rails 6a at the side of the receptacle. The hollow body 8 is filled with hydraulic fluid 9 to which vibratory impulses are applied so that the walls of the hollow body 8 vibrate. There is thus assured good transmission between the vibrating hydraulic fluid in the hollow body 8 and the fluid in the receptacle 1. At the bottom of the receptacle 1 there are provided nozzles 10 which are fed by conduits 11 and inject air or oxygen into the receptacle. Advantageously, the air or oxygen is not injected until a substantially thick layer of sludge has been formed over the nozzles because then the gas bubbles take effect better in the sludge and do not rise to the upper surface of the dispersion in the receptacle 1.

As in the embodiment of FIGS. 1 and 2, the hollow body 8 is suspended from the carriage 6 which is provided with means for raising or lowering the hollow body 8 so that it can be lifted out of the dispersion in the receptacle or at least is moveable to an edge of the receptacle in order to simplify emptying of the sludge. As illustrated in FIG. 5, the hydraulic cylinder 4 of the vibration unit in which a piston 14 is reciprocable—or the hollow body 8—is connected with the control unit through a conduit 12. An embodiment of the control unit as illustrated in FIG. 5 comprises a housing 15 in which a control rotor 16 is rotatable. Hydraulic oil from a storage tank 17 is delivered by a pump 18 through a conduit 19 to the housing 15 of the control unit. As the control piston 16 has two grooves 16A and 16B, the conduit 12 leading to the hydraulic cylinder 4 or hollow body 8 is alternately connected with the pressure line 19 and with the return line 20 with a frequency depending on the speed of rotation of the control piston 16.

In another embodiment illustrated in FIG. 6, a piston 22 having a radial channel 23 leading to a central channel 24 connected with the hydraulic cylinder 4 or hollow body 8 is rotatable in a housing 21. Here also pressure oil is supplied by a pump 18 to bores or grooves 25, 26 in the housing 21. Between each two bores or grooves 25, 26 there are two further bores 27, 28 connected with the return line 20 through an adjustable over-pressure valve 29. As the piston 22 rotates in the housing 21, the channel 23 communicates alternately with the oil pressure line through bores 25, 26 and the return line through bores 27, 28, thereby transmitting pressure pulses through the line 24 to the cylinder 4 or hollow body 8. It will be understood that bores connected with the pressure line, alternating with bores connected with the return line, can be provided throughout the inner circumference of the housing. Moreover, the circumferential extent of the bores and the distance between the bores are selected to provide the vibration characteristics desired. With this arrangement, pressure pulses are produced, the frequency and amplitude of which can be periodically varied.

It will be understood that instead of rotating, the piston of the control device may be ocillated through a selected angle.

In the treatment of sewage sludge with, for example, a frequency of 50 Hertz, the plates have an amplitude of 3-4 mm, the acceleration peak value is 30 g and the back movement is about half that or less. An extraordinarily rapid separation of the solid particles from the liquid phase was achieved.

Figure 7:
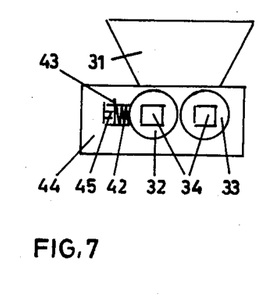
FIG. 7 is a schematic end view of apparatus with a pair of cylinders for crushing ore-containing stone.

The apparatus shown schematically in FIG. 7 comprises a hopper 31, at the lower end of which there is a pair of rollers 32, 33 which turn in opposite directions. They can be considered as tool and counter-tool respectively. At least one of the rollers 32, 33 is vibrated in an axial direction. For this purpose a hydraulic work cylinder 35 is provided between one end of the roller and its bearing 34 while between the other end of the roller and its respective bearing 34 a spring 36 is provided. The hydraulic cylinder 35 is fed over a conduit 37 from a rotary valve 38. The rotary valve 38 is fed through conduit 39 with a pressure source and further is connected with a return line 40 to return the hydraulic fluid to a storage tank from which hydraulic oil is supplied to the pressure source. As the rotary valve 38 rotates, pressure pulses are supplied intermittently to the hydraulic cylinder 35 to move the roller 33 periodically toward the right as viewed in FIG. 8, return movement being effected by the spring 36.

Figure 8:
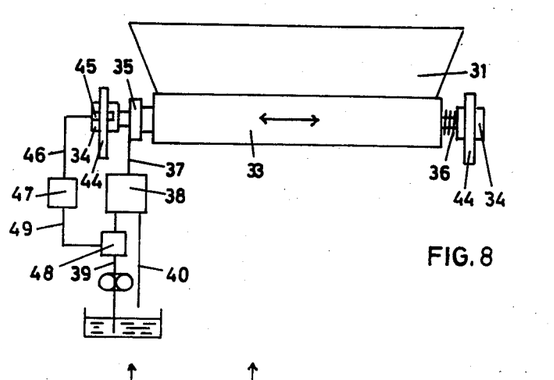
FIG. 8 is a front elevation of the apparatus shown in FIG. 7.

In the manner illustrated in FIG. 8 for roller 33, roller 32 can also be vibrated in an axial direction. Such vibration is likewise produced through a work cylinder 35 but is opposite in phase to the vibration of roller 33. For this purpose, the cylinder 35 for vibrating roller 32 is connected with the pressure source when the cylinder 35 of roller 33 is connected with the return line.

Through the actuation of one roller 33 or both rollers 32, 33 with axial vibration, the material passing through the gap between the rollers is not only crushed and pressed but is also intensively rubbed and thereby disintegrated under pressure and torn apart. The superposed cross forces reduce the cylinder forces and thereby produce a finer material.

To avoid the faces of the rollers being rubbed together by the axial vibration when the apparatus is running empty, there is provided a protective device which interrupts the vibration of the cylinders as soon as the machine is running empty. The bearing 34 of the roller 33 is moveable against the force of a spring 42 in a recess 43 of the machine frame 44. Between the spring 42 and the frame 44 there is provided a pressure measuring device 45 which measures the pressure of the spring 42 on the machine frame 44. That is the pressure with which the rollers 32, 33 are pressed together. This pressure increases the wider the rollers 32, 33 are spread apart by the material passing between them. The pressure sensing device 45 is connected through a line 46 with a control device 47 which is connected by a line 49 with a magnetic valve 48 in the pressure line that leads to the control valve 38. On the pressure between the rollers as sensed by the pressure senser 45 falling below a predetermined value, the magnetic valve 48 is closed so that the control valve 38 is no longer supplied with pressure fluid but is merely connected with the return line 40. Hence, the working cylinder 45 for vibrating the roller or rollers in an axial direction is no longer connected with the pressure line. Hence, axial movement of the roller 33, or also roller 35, occurs. This axial movement is resumed only when the gap between the rollers is increased by the material to be processed passing between the rollers so that the pressure in the pressure sensor 45 is again increased and the control device 47 opens the magnetic valve 48.

Instead of the pressure sensor 45, there can be used a motion pick-up which measures the distance between bearings 34 of the rollers 32, 33 or measures directly the width of the gap between the rollers or the distance between the roller 32 and a reference point on the machine frame 44.

Figure 9:
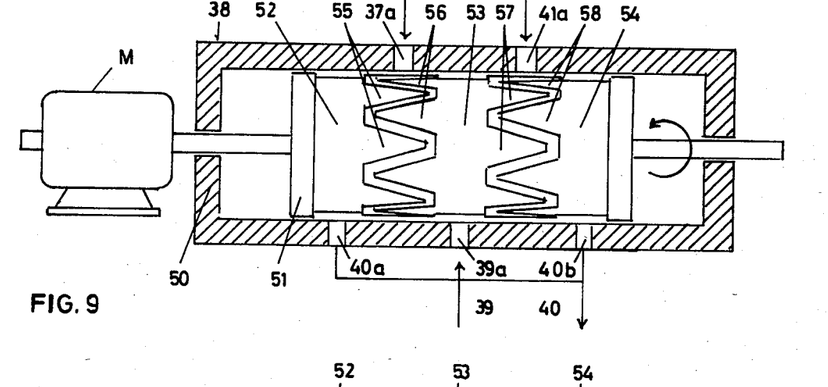
FIG. 9 is a cross-section of a hydraulic control valve.
Figure 10:
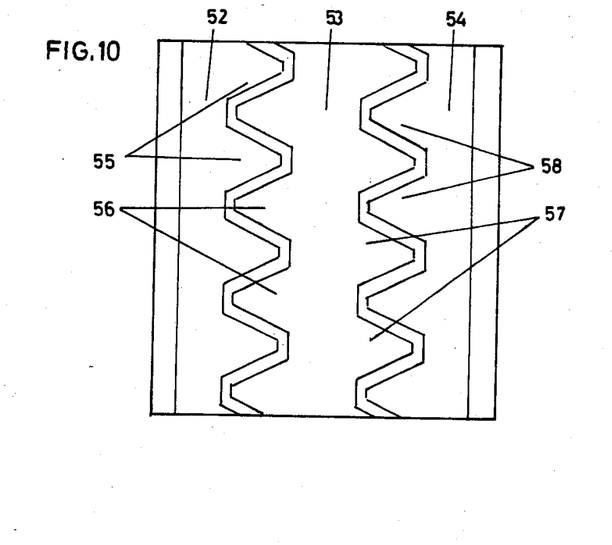
FIG. 10 is an enlarged perspective view of the rotating cylinder of the control valve shown in FIG. 9.

As illustrated by way of example in FIGS. 9 and 10, the control device 38 of FIG. 8 is constructed as follows: In a housing 50, a rotating cylinder 51 driven by a variable speed motor M is axially displaceable and can be fixed in selected axial position. Through the conduit 39 oil under pressure is fed to port 39a in the housing 50 of the control valve. Through conduit 40 connected with ports 40a and 40b of the housing 50, oil is returned to the oil reservoir. The rotating cylinder 51 is provided on its periphery with annular grooves 52, 53 and 54 communicating respectively with ports 40a, 39a and 40b. From annular groove 52 circumferentially spaced branch grooves 55 extend axially almost to annular groove 53. From annular groove 53 circumferentially spaced branch grooves 56 extend axially almost to annular groove 52 while circumferentially spaced branch grooves 57 extend axially almost to annular groove 54. From annular groove 54 circumferentially spaced branch grooves 58 extend axially almost to annular groove 53. The grooves 55 and 56 are so arranged as to lie between one another. Likewise the grooves 57 and 58 are so arranged that they lie between one another. In a circumferential direction, the branch grooves 56 and 57 are displaced circumferentially relative to one another. Grooves 56 are aligned axially with grooves 58 while grooves 57 are aligned axially with grooves 55. As seen in FIGS. 9 and 10, the branch grooves 55 to 58 are tapered in an axial direction.

Oil under pressure is fed to annular groove 53 through conduit 39 and port 39a and flows into branch grooves 56 and 57. Annular grooves 52 and 54, together with their branch grooves 55 and 58, respectively, are in communication with the oil return line 40 through ports 40a and 40b, respectively. The housing 50 is further provided with a port 37a connected by a line 37 with work cylinder 35 of roller 33 and with a port 41a connected by line 41 with the work cylinder 35 of the other roller 32. Port 37a is positioned to communicate alternately with branch grooves 55 and 56 as the cylinder 51 rotates, while port 41a is positioned to communicate alternately with branch grooves 57 and 58.

Through this arrangement, the following occurs: As the cylinder 51 rotates, the port 37a communicates alternately with branch grooves 56 and branch grooves 55. When the port 37a is in communication with branch grooves 56, oil under pressure is fed from circumferential groove 53 to line 37 for very short intervals of time. In between these intervals, line 37 is connected with the return line 40 through branch grooves 55 and circumferential groove 52. Thus, as the cylinder 51 constantly rotates, line 37 is connected alternately with pressure line 39 and return line 40 in continual sequence. The speed of rotation of the cylinder 51 determines the frequency of the oil pressure pulses supplied intermittently from oil pressure line 39 to line 37.

The same thing happens with respect to branch grooves 57 and 58 through which line 41 is alternately connected with pressure line 39 and return line 40 in continual sequence. However, this is out of phase with respect to line 37, since branch grooves 57 are circumferentially offset relative to branch grooves 56. As the branch grooves 55 to 58 are suitably tapered toward their outer ends, a variation of the length of the hydraulic impulses can be effected by displacing the cylinder 51 axially whereby the intervals of time that lines 37 and 41 are connected with pressure line 39 and return line 40 can be varied.

The frequency of the vibration produced is regulated by controlling the speed of the motor M. The amplitude and acceleration can be selected by the hydraulic oil pressure, the cross sectional area of the cylinder-piston unit, the cross section of the connecting lines and the flow-through opening of the control valve.

The hydraulic cylinder 35 illustrated in FIG. 8 has oil pressure applied intermittently to only one side of its piston. It is hence necessary to provide the spring 36 to move the roller in the opposite direction. However, a double-acting hydraulic cylinder can be used with oil pressure applied alternately to opposite sides of the piston. In this event, one end of the hydraulic cylinder is connected with line 37, while the other end of the hydraulic cylinder is connected with line 41 of FIG. 9.

Figure 11:
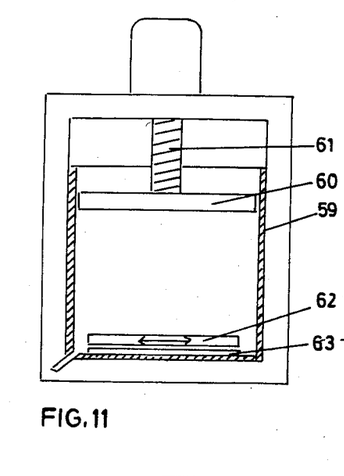
FIG. 11 is a schematic cross-section through a press.
Figure 12:
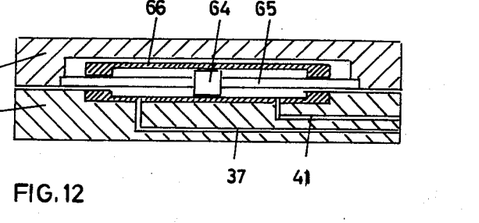
FIG. 12 is an enlarged cross-section through a vibrator which is positioned in the press of FIG. 11.

The press shown in FIG. 11 is for pressing juice out of fruit. In a cylinder 59 to be filled with the fruit, a piston 60 is movable in known manner either through a hydraulic cylinder or a threaded spindle 61 or other means in a direction toward the bottom of the cylindrical container 59 which is provided with openings for discharge of the fruit juice. On the bottom of the container, there is a vibrator which is shown more fully in FIG. 12. The vibrator comprises two discs 62, 63 which face one another and are moveable relative to one another in the plane of their faces by means of a piston 64. The piston 64 is connected by piston rod 65 with disc 62 and is moveable axially in a hydraulic cylinder 66 which is located between the discs and is fixed to disc 63. Opposite end portions of the cylinder 66 are connected by lines 37 and 41 respectively with the control valve 38 shown in FIG. 9. With this vibrator, vibrations are produced at the bottom of the cylindrical container 59 in a direction transverse to the direction of movement of the piston 60. Such vibrations are transmitted to the material being processed in the container 59 and lead to particularly efficient and rapid pressing out of the juice as the solid material is compacted at the bottom of the container.

Figure 13:
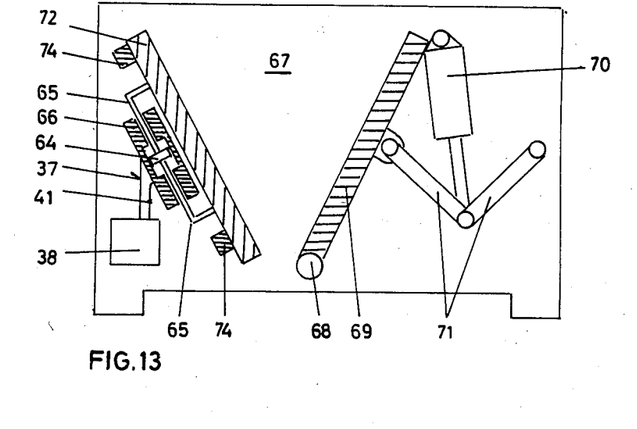
FIG. 13 is a cross-section through a jaw crusher.

FIG. 13 illustrates a jaw-breaker in which a moveable jaw 69 pivotally supported by a shaft 68 in the frame 67 is moveable toward the jaw 72 by means of a hydraulic cylinder-piston unit 70 of which the piston rod is connected with toggle linkage 71. The jaw 72 comprises a plate which is displaceable in a direction parallel to its outer face by means of a piston 64 reciprocable in a hydraulic cylinder 66 and connected to the plate 72 by piston rods 65. Opposite end portions of the cylinder 66 are connected respectively by lines 37 and 41 with the control valve 38 shown in FIG. 9. The plate form jaw 72 serving as the counter-tool is supported in the machine frame 67 by slide rails 74. Through the vibration of the plate form counter-jaw 72, the breaking of the stone is effected more rapidly and with less force by reason of the constant small alternation of the angle of attack of the forces exerted by the moveable jaw 69. It will be seen that the vibratory movement of the counter-jaw 72 is transverse to the direction of movement of the jaw 69.

Figure 14:
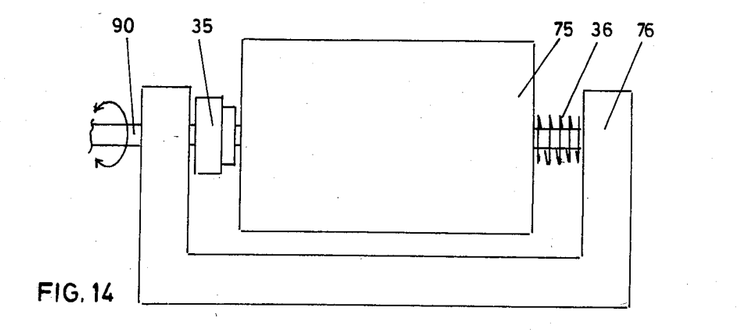
FIG. 14 is a schematic elevation of a ball mill.

In FIG. 14, there is shown a ball mill in which a cylinder 75 is rotatably supported on a frame 76 by a shaft 90 driven by conventional means. The container 75 is vibrated in an axial direction by cooperation of a hydraulic work cylinder 35 which moves the container axially in one direction and a return spring 36. It will be understood that instead of the return spring 36, the hydraulic cylinder 35 can be made double-acting or a hydraulic cylinder can be provided at each end of the container 75. By reason of this vibration, there occurs not only a working of the material in the container through the impact of the falling balls, but at the same time there is a rubbing action between the container 75 and the balls at the bottom of the container. By reason of the axial forces acting to vibrate the container, the mill bodies inside the container 75 are also vibrated. Through this action, a more rapid milling of the material in the container is obtained.

It will be realized that there are many more possible applications of the invention to a wide variety of machines and apparatus.

Figure 15:
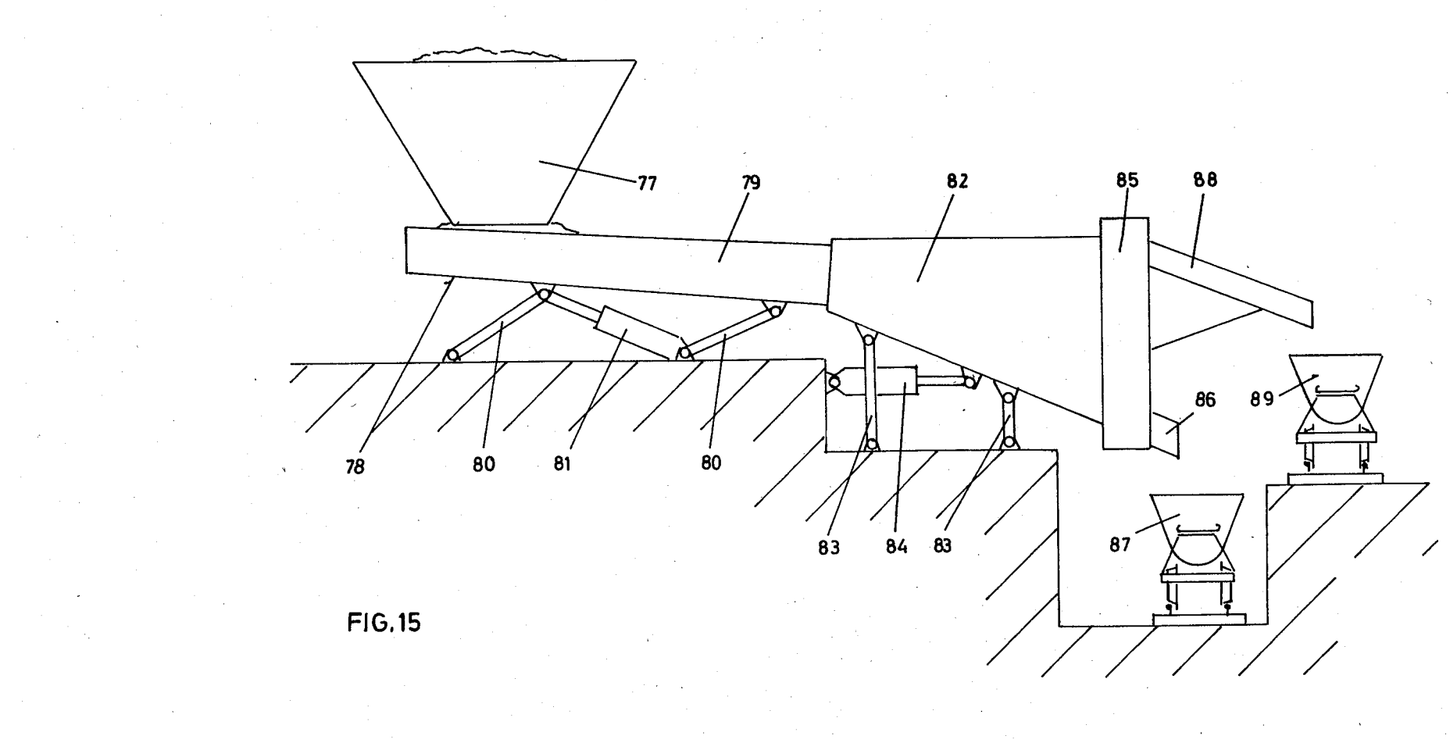
FIG. 15 is a schematic side elevation of a solid matter separating apparatus.

Thus, for example, the invention is advantageously applied to ore preparation. Crushed ore is processed first in a jaw-breaker, as illustrated in FIG. 13, and then in a roller mill, as illustrated in FIGS. 7 and 8, to reduce it to grain size. The granulated material is then charged into the hopper 77 of the solid material separating apparatus illustrated schematically in FIG. 15. From the hopper 77, this mixture of granulated solid material flows first along a conveyor 79 of U-shaped cross-section with an inclined floor 78 supported by two pivoted links 80. A vibration movement with unequal forward and return movement is imparted to the conveyer 79 by a cylinder-piston unit 81. From the conveyer 79 the granulated ore falls into a second vibrating conveyer 82 which is supported by links 83 and is vibrated by a cylinder-piston unit 84. At the end of the conveyer 82 there is a stationary wall 85 with a lower discharge chute 86 out of which the heavier ore falls into a dump cart 87, as well as with an upper discharge chute 88 out of which the lighter barren stone falls into a dump cart 89.

While preferred embodiments of the invention have been illustrated in the drawings and are herein particularly described, it will be understood that the invention has still other applications and is in no way limited to the illustrated embodiments.

What I claim is:

1. Apparatus for treating material comprising a work member in contact with the material to be treated and means for vibrating said work member, said vibrating means comprising a hydraulic servomotor connected with said work member, hydraulic fluid supply means for connecting said servomotor alternately with a source of hydraulic fluid under pressure and with a return line in rapid succession to supply to said servomotor a rapid sequence of hydraulic impulses to impart to said work member non-sinusoidal vibration of selected frequencies and amplitude, and means for varying at least one of the acceleration, frequency and amplitude of said vibration during treatment of the material, said hydraulic fluid supply means comprising a rotary valve comprising a housing having a cylindrical bore and a cylindrical rotor rotatable and axially slidable in said bore, said housing having a first port connected with said source of hydraulic fluid under pressure, a second port connected with said return line and a third port connected with said servomotor, said cylindrical rotor having a first annular groove in position to communicate with said first port, a second annular groove spaced axially from said first annular groove and in position to communicate with said second port, a first series of circumferentially spaced branch grooves extending axially from said first annular groove, and a second series of circumferentially spaced branch grooves extending axially from said second annular groove toward said first annular groove and intercalated between said first branch grooves, said first and second branch grooves being in position to communicate alternately with said third port and thereby connect said servomotor alternately with said source of hydraulic fluid under pressure and said return line in rapid succession as said cylindrical rotor rotates.

2. Apparatus according to claim 1, in which said cylindrical rotor has a third annular groove spaced axially from said second annular groove in a direction away from said first annular groove, a third series of circumferentially spaced branch grooves extending axially from said third annular groove toward said second annular groove, and a fourth series of circumferentially spaced branch grooves extending axially from said second annular groove toward said third annular groove and intercalated between said third branch grooves, said fourth branch grooves being circumferentially offset from said second branch grooves, and in which said housing has a fourth port connected with said source of hydraulic fluid under pressure and positioned to communicate with said third annular groove, and a fifth port connected with a second servomotor and positioned to communicate alternately with said third and fourth branch grooves to connect said second servomotor alternately with said source of hydraulic fluid under pressure and said return line in rapid succession as said cylindrical rotor rotates.

3. Apparatus according to claim 2, particularly for separating solid material from the liquid phase of a dispersion, comprising a receptacle for said dispersion, said work member comprising at least one vertical plate suspended in said dispersion contained in said receptacle.

4. Apparatus according to claim 3, particularly for separating solid material from the liquid phase of a dispersion, comprising a receptacle for said dispersion, said work member comprising at least a part of a wall of said receptacle.

5. Apparatus according to claim 1, particularly for separating solid material from the liquid phase of a dispersion, comprising a receptacle for said dispersion, said work member comprising a horizontal vibrating plate at the bottom of said receptacle.

6. Apparatus according to claim 5, in which said horizontal plate is provided with a plurality of apertures for the injection of a gas into the bottom of said receptacle.

7. Apparatus according to claim 1, in which said work member comprises at least one of a pair of opposed rollers for crushing or pressing material between them and in which said servomotor vibrates at least one of said rollers in an axial direction.

8. Apparatus according to claim 7, in which means is provided for interrupting said vibrations when the distance between said rollers becomes less than a predetermined value.

9. Apparatus according to claim 1 in which said apparatus is a jaw breaker comprising two jaws and means for moving the jaws toward one another, and in which said vibrating means comprises means for vibrating one of said jaws in a direction parallel to a face of said jaw.

10. Apparatus according to claim 1 in which said apparatus is a ball mill comprising a cylinder rotating about a horizontal axis, and in which said vibrating means comprises means for vibrating said cylinder in an axial direction.

11. Apparatus for treating material and particularly for separating solid material from the liquid phase of a dispersion, comprising a receptacle for containing said dispersion a work member comprising a pair of plates in contact with said dispersion contained in said receptacle, and means for vibrating said work member, said vibrating means comprising a hydraulic cylinder-piston unit disposed between said plates with the cylinder connected to one of said plates and the piston connected to the other, hydraulic fluid supply means for connecting said cylinder alternately with a source of hydraulic fluid under pressure and with a return line in rapid succession, whereby a rapid sequence of hydraulic impulses supplied to said cylinder-piston unit by said supply means produces non-sinusoidal vibration of said plates toward and away from one another, and means for varying at least one of the acceleration, frequency and amplitude of said vibration during treatment of the material.

12. Apparatus for treating material and in particular for separating solid material from the liquid phase of a dispersion, comprising a receptacle for containing said dispersion a hollow body in contact with said dispersion contained in said receptacle and having opposite sides, hydraulic fluid supply means for connecting the interior of said hollow body alternately with a source of hydraulic fluid under pressure and with a return line in rapid succession, whereby a rapid sequence of hydraulic impulses supplied to said hollow body by said supply means produces non-sinusoidal vibration of said opposite sides of said hollow body toward and away from one another, and means for varying at least one of the acceleration, frequency and amplitude of said vibration during treatment of the material.

13. Apparatus according to claim 12 in which said hollow body is suspended in said dispersion.

14. Apparatus according to claim 13, in which a plurality of nozzles are provided at the bottom of said receptacle for injecting gas into said dispersion contained in said receptacle during vibration of said plate.

15. Apparatus for treating material and in particular for pressing juice out of fruit, said apparatus comprising a press in the form of a cylindrical container with a piston movable downwardly therein, a work member comprising a pair of horizontal vibrating plates at the bottom of said container, a hydraulic cylinder-piston unit disposed between said plates with the cylinder connected to one of said plates and the piston connected the other, hydraulic fluid supply means for connected said cylinder alternately with a source of hydraulic fluid under pressure and with a return line in rapid succession, whereby a rapid sequence of hydraulic impulses supplied to said cylinder piston unit by said supply means produces non-sinusoidal vibration of said plates relative to one another, and means for varying at least one of the acceleration, frequency and amplitude of said vibrations during treatment of the material.

16. Apparatus according to claim 15 in which said plates vibrate relative to one another in a direction in the plane of said plates.

17. Apparatus for treating material comprising a work member in contact with the material to be treated and means for vibrating said work member, said vibrating means comprising a hydraulic servomotor connected with said work member, hydraulic fluid supply means for connecting said servomotor alternately with a source of hydraulic fluid under pressure and with a return line in rapid succession to supply to said servomotor a rapid sequence of hydraulic impulses to impart to said work member non-sinusoidal vibration of selected frequencies and amplitude, and means for varying at least one of the acceleration, frequency and amplitude of said vibration during treatment of the material, said hydraulic fluid supply means comprising a rotary valve comprising a housing having a cylindrical bore with a series of circumferentially spaced ports in said housing opening into said cylindrical bore, a piston rotatable in said bore, said piston having a central channel and a radial channel extendning from said central channel to the periphery of piston in position to commumunicate successively with said ports in said housing as said piston rotates, said central channel being connected with said servomotor, alternate ones of said ports being connected with said source of hydraulic fluid under pressure and intervening ports being connected with said return line, whereby as said piston rotates in said housing, said radial channel and hence said central channel and said servomotor are alternately connected with said source of hydraulic fluid under pressure and said return line in rapid succession to supply to said servomotor a rapid sequence of hydraulic impulses to impart to said work member non-sinusoidal vibration of selected frequencies and amplitude, the speed of rotation of said cylinder being varied during treatement of the material to vary the frequency of vibration produced by said servomotor.

18. Apparatus according to claim 17, in which selected ones of said ports are of different circumferential extent from one another.

19. Apparatus for treating material and in particular for treating ore comprising a first jaw having a face, means supporting said first jaw for movement only parallel to its face, a second jaw, means pivotally supporting said second jaw for movement toward and away from said first jaw, hydraulic means for forcibly moving said second jaw toward said first jaw, a hydraulic cylinder fixedly mounted behind said first jaw and having a bore parallel to said face of said first jaw, a piston reciprocable in said cylinder and connected to said first jaw whereby reciprocation of said piston in said cylinder produces reciprocatory movement of said first jaw parallel to said face, hydraulic fluid supply means for sequentially connected one end of said cylinder bore alternately in rapid succession with a source of hydraulic fluid under pressure and a fluid return line while synchronously connecting the opposite end of said cylinder bore alternately with said fluid return line and said source of hydraulic fluid under pressure, whereby a rapid sequence of hydraulic impulses supplied to said cylinder-piston unit by said supply means produces non-sinusoidal vibration of said first jaw parallel to said face, and means for varying at least one of the acceleration, frequency and amplitude of said vibration during treatment of the material.

* * * * *